Nov. 20, 1956 S. S. SUMMERS 2,771,078
THRESHING MACHINE FOR VEGETABLES AND GRAINS
Filed Sept. 9, 1955 2 Sheets-Sheet 1

INVENTOR.
SEBERN S. SUMMERS
BY
McMorrow, Berman + Davidson
ATTORNEYS

Nov. 20, 1956  S. S. SUMMERS  2,771,078
THRESHING MACHINE FOR VEGETABLES AND GRAINS
Filed Sept. 9, 1955  2 Sheets-Sheet 2

INVENTOR.
SEBERN S. SUMMERS
BY
McMorrow, Berman + Davidson
ATTORNEYS

2,771,078

Patented Nov. 20, 1956

2,771,078

THRESHING MACHINE FOR VEGETABLES AND GRAINS

Sebern S. Summers, Grand Junction, Colo.

Application September 9, 1955, Serial No. 533,380

4 Claims. (Cl. 130—30)

This invention relates to threshing machines. More particularly, the invention has reference to apparatus of this type so designed as to act with particular efficiency on grains or vegetables that are especially prone to cracking, with accompanying loss of revenue to the farm operator, during threshing. Beans and peas in particular have a high percentage of loss for this reason, and while the instant device is well adapted for threshing other vegetables and grains, it is especially suited for threshing beans and peas due to its being provided with relatively soft, resilient, material-engaging surfaces.

Important objects of the invention are to insure that the material being threshed will be in contact only with surfaces that are yieldable to an extent that will prevent cracking and splitting of the seed or grain; to bring the material into contact with friction-producing surfaces that will maintain the flow of the material through the machine at a uniform rate and will prevent jamming of the same within the machine; to thresh the material without impact of blades, beaters, or like means thereagainst; to make use of readily obtainable, comparatively inexpensive components; and to permit assembly of said components in any desired number, according to the size of the machine under construction.

Other objects will appear from the following description, the claims appended thereto, and from the annexed drawing, in which like reference characters designate like parts throughout the several views, and wherein:

Figure 1:
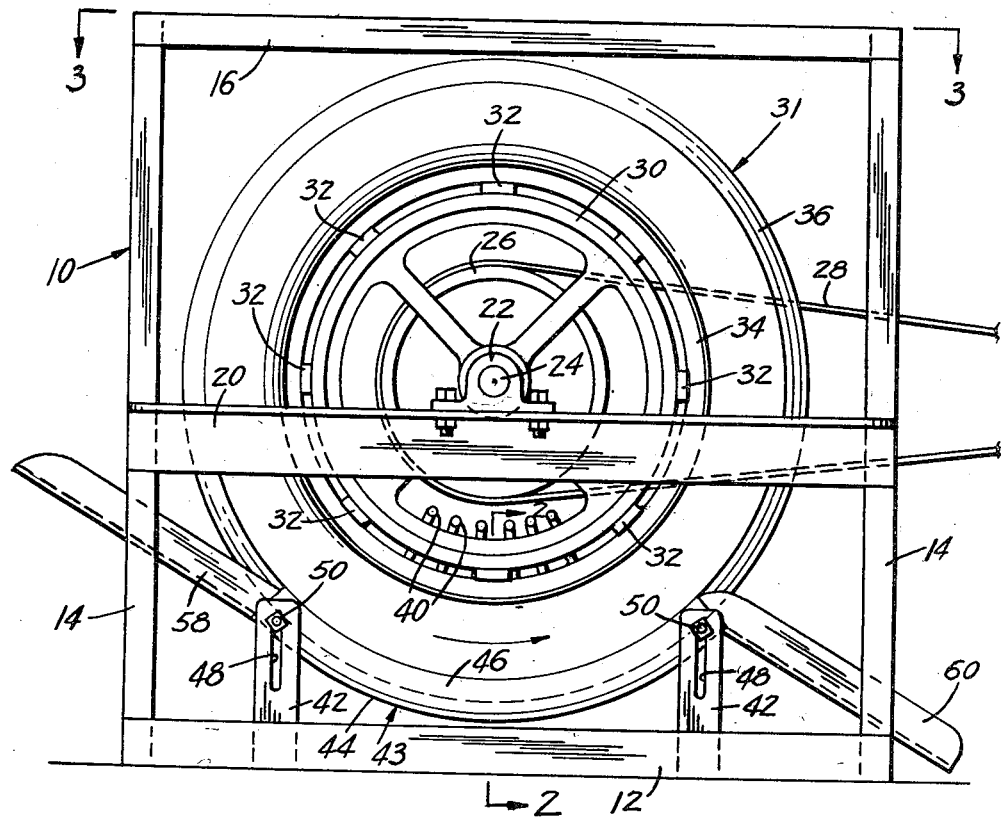
Figure 1 is a side elevational view of apparatus according to the present invention.

The device constituting the present invention includes a frame 10 having a pair of base rails 12 extending along the opposite sides of the machine at the lower end thereof. Rigidly secured at their lower ends to the base rails are upstanding corner posts 12 and fixedly connected between the upper ends of the corner posts at opposite sides of the machine are horizontal upper side rails 16. Upper cross members 18 are fixedly connected between the upper ends of the corner posts at the front and back of the frame, and an intermediate upper cross member is similarly connected between the midlength portions of the upper side rails.

At opposite sides of the frame, horizontal bearing support bars 20 are fixedly connected between the intermediate portions of the corner posts. Mounted on the bars 20 medially between the opposite ends thereof are transversely aligned bearings 22 in which are journalled the opposite ends of a horizontal shaft 24 extending transversely within the frame. A pulley 26 is secured to one end of the shaft, and trained about and driving said pulley is a belt 28 driven by a prime mover or other drive means, not shown.

Adjacent the bearings 22, spoked wheels 30 are keyed to or otherwise made rotatable with the shaft, and constitute heads of a rotary threshing drum generally designated at 31.

Angularly spaced equal distances apart about the circumferences of the drum heads 30 are elongated, straight support bars 32, secured fixedly to the inner surfaces (Figure 2) of side by side wheel rims 34 spaced uniformly apart over the length of the bars 32. Pneumatic tires 36 are carried by the wheel rims. The wheel rims and tires can be conventional automobile rims and tires, thus to reduce the cost of manufacture of the device through the usage of easily obtainable components.

Figure 2:
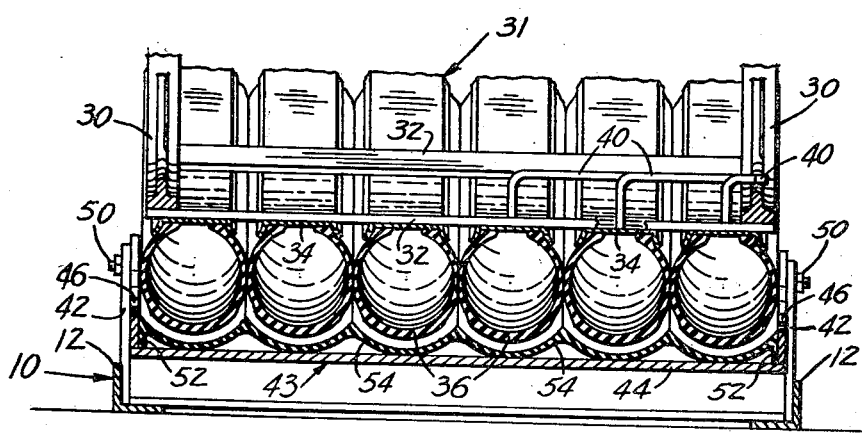
Figure 2 is a transverse sectional view on line 2—2 of Figure 1.

The wheels constituted by rims 34 and tires 36 are so arranged that the side walls of the tires are in contact with one another as shown in Figuer 2, and also as shown in Figure 2, the peripheral walls of the tires are outwardly, transversely convexed, so as to define on the drum a corrugated side wall.

Figure 3:
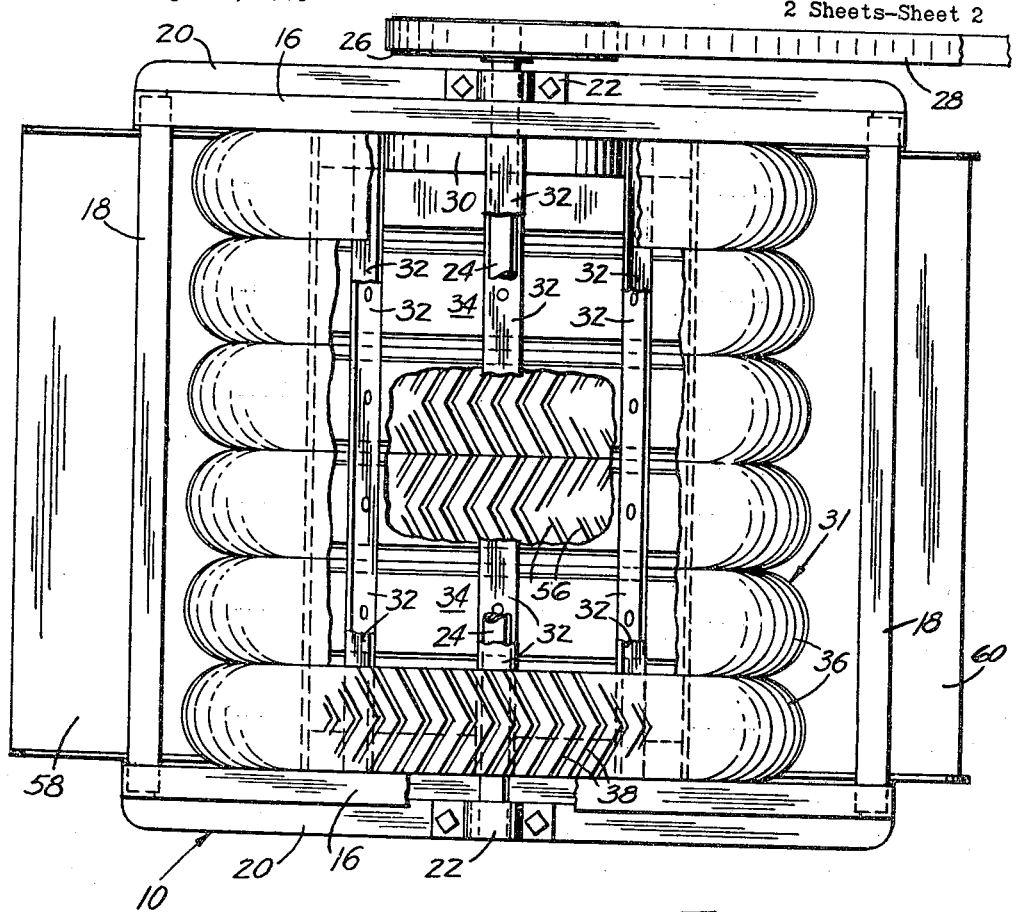
Figure 3 is a top plan view as seen from line 3—3 of Figure 1, some parts being broken away.

As shown in Figure 3, the treads 38 formed on the outwardly convex peripheral walls of the tires are of herringbone formation in a preferred embodiment of the invention, so as to frictionally engage the materials to be threshed, and drive said materials along a chute to be described hereinafter, with the materials, while remaining in contact with the tires 36, being threshed in a manner to be discussed in greater detail hereinafter.

The tires are filled with air at a selected pressure, and to this end, extending from each pneumatically tired wheel is a filling tube 40. The several filling tubes are of L-shape, each tube including a short leg connected in communication with the interior of the associated tire, and an elongated leg extending longitudinally of the drum, as shown in Figure 2, to one end of the drum. The several longer legs of the said tubes are disposed in closely spaced relation at said end of the drum (Figure 1), and are preferably equipped with conventional tire valves to facilitate the filling of the tires with air to a selected extent.

Secured fixedly at their lower ends to and projecting upwardly from the respective lower side rails 12 are chute-supporting standards 42, supporting a chute generally designated at 43. The chute includes a main trough 44 which is longitudinally curved over its full length, about the axis of rotation of the drum, and extends in close proximity to the peripheral walls of the tires as shown in Figure 2. The main trough 44 is formed at opposite sides thereof with upwardly projecting flanges or side walls 46. The standards 42 have vertical slots 48 (Figure 1) and extending through said slots are bolts 50, projecting through apertures formed in the ends of the flanges 46. The main trough, and hence the entire chute, is thus mounted upon the frame for up and down adjustment, toward and away from the peripheral walls of the wheels.

Secured to the inner surfaces of the flanges 46 (Figure 2) are the depending side portions 52 of a chute liner 54, the liner having a herringbone surface pattern matching that of the tires and being formed of a soft, resilient material such as rubber, and transversely corrugated over its full width in correspondence with the transverse convexity of the several pneumatically tired wheels. The material of which the lines is formed can be of substantial thickness, so as to reduce the flexibility of the liner to a substantial extent, thus causing the liner to hold its transversely corrugated shape, and further causing the liner to yield no more than is absolutely necessary to prevent cracking and splitting of the materials being threshed, while still assuring that said materials will be confined in the space between the liner and the drum wheels for breakage of the pods or hulls without damage to the beans and peas that are being extracted from said hulls in the process.

The chute includes, in addition to the main trough defined by plate 44 and liner 54, inlet and outlet troughs 58, 60 respectively. These are inclined for gravitation of the materials being threshed along their lengths, the inlet trough being inclined downwardly in a direction toward the main trough to feed the raw materials to the apparatus. The outlet trough is inclined in a direction downwardly, away from the main trough, for flow of the threshed material from the apparatus to a suitable receptable, not shown. The inlet and outlet troughs are welded, at the opposite ends of the main trough, to the main trough so as to be adjustable therewith in a vertical direction relative to the rotary drum.

The apparatus is so designed as to cause the materials being threshed to travel along an arcuate path, over part of the circumferences of the pneumatically tired wheels, and during this portion of the travel of the materials, they are subjected to a threshing action by engagement between the rubber surfaces of the pneumatically tired wheels and chute liner. Further, the materials are moved along their paths by rotation of the drum and the herringbone formation of the treads. The herringbone tread formation is further designed to cause materials to move into the spaces between the tread teeth or ribs, to further aid in cracking or splitting of the beans, peas, or other materials being threshed. It will be noted, in this regard, that the construction is such that excessive accumulation of the material at any point along the length of the drum that is, over the width of the chute, is prevented, due to the mating or complementary corrugations of the side wall of the drum and of the chute. Further, any excessive accumulation of said material in one of the trough-like corrugations of the chute liner will still result in a minimum of splitting or cracking, due to the yieldable construction of the chute liner and of the threshing drum side wall.

In some commercial embodiments, the treads of the pneumatic tires 36 may be varied somewhat, according to the particular materials being threshed.

While the device is particularly well suited for threshing of beans, peas, and like vegetables, it is not intended to be restricted entirely to this particular use. Instead, the machine can, it is believed, be readily usable in the threshing of various grains, and other agricultural products.

The machine will do a good job in rubbing the seed out of alfalfa and red clover pods.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A threshing machine for beans and like vegetables comprising a frame: a threshing drum rotatably mounted on said frame and including a plurality of side by side, pneumatically tired wheels connected for joint rotation, said wheels each having an outwardly convex peripheral wall, the side walls of the several tires of the wheels being in contact, whereby to define on the drum a side wall having circumferentially extending corrugations from end to end of the drum with each corrugation being defined by the outwardly convex wall of a tire; and a chute including a main trough longitudinally curved over its full length about the axis of rotation of the drum and extending in close proximity to the outwardly convex walls of the tires, said trough being curved only in a longitudinal direction, so as to have a straight cross sectional configuration at all locations along the length thereof, the chute further including a liner soft, resilient material curved longitudinally correspondingly to the trough, said liner being fixedly secured along its opposite side edges to the corresponding sides of the trough, the liner being formed with longitudinally extending corrugations each of which in width is substantially equal to the width of a tire adjacent thereto, the midwidth portion of each corrugation of the liner bearing against the surface of the trough so as to be engaged thereby against movement away from the periphery of the adjacent tire.

2. A threshing machine for beans and like vegetables comprising a frame: a threshing drum rotatably mounted on said frame and including a plurality of side by side, pneumatically tired wheels connected for joint rotation, said wheels each having an outwardly convex peripheral wall, the side walls of the several tires of the wheels being in contact, whereby to define on the drum a side wall having circumferentially extending corrugations from end to end of the drum with each corrugation being defined by the outwardly convex wall of a tire: and a chute including a main trough longitudinally curved over its full length about the axis of rotation of the drum and extending in close proximity to the outwardly convex walls of the tires, said trough being curved only in a longitudinal direction, so as to have a straight cross sectional configuration at all locations along the length thereof, the chute further including a liner of a soft resilient material curved longitudinally correspondingly to the trough, said liner being fixedly secured along its opposite side edges to the corresponding sides of the trough, the liner being formed with longitudinally extending corrugations each of which in width is substantially equal to the width of a tire adjacent thereto, the midwidth portion of each corrugation of the liner bearing against the surface of the trough so as to be engaged thereby against movement away from the periphery of the adjacent tire, said trough being mounted upon the frame for rectilinear adjustment toward and away from the peripheries of the wheels, in a path radial of the drum.

3. A threshing machine for beans and like vegetables comprising a frame: a threshing drum rotatably mounted on said frame and including a plurality of side by side, pneumatically tired wheels connected for joint rotation, said wheels each having an outwardly convex peripheral wall, the side walls of the several tires of the wheels being in contact, whereby to define on the drum a side wall having circumferentially extending corrugations from end to end of the drum with each corrugation being defined by the outwardly convex wall of a tire; and a chute including a main trough longitudinally curved over its full length about the axis of rotation of the drum and extending in close proximity to the outwardly convex walls of the tires, said trough being curved only in a longitudinal direction, so as to have a straight cross sectional configuration at all locations along the length thereof, the chute further including a liner of a soft resilient material curved longitudinally correspondingly to the trough, said liner being fixedly secured along its opposite side edges to the corresponding sides of the trough, the liner being formed with longitudinally extending corrugations each of which in width is substantially equal to the width of a tire adjacent thereto, the midwidth portion of each corrugation of the liner bearing against the surface of the trough so as to be engaged thereby against movement from the periphery of the adjacent tire, the corrugations of the tires and liner having matching herringbone patterns to frictionally engage material being threshed and advance the same from end to end of the chute responsive to rotation of the drum.

4. A threshing machine for beans and like vegetables comprising a frame; a threshing drum rotatably mounted on said frame and including a plurality of side by side, pneumatically tired wheels connected for joint rotation, said wheels each having an outwardly convex peripheral wall, the side walls of the several tires of the wheels being in contact, whereby to define on the drum a side wall having circumferentially extending corrugations from end to end of the drum with each corrugation being defined by the outwardly convex wall of a tire; and a chute including a main trough longitudinally curved over its full length about the axis of rotation of the drum and extending in close proximity to the outwardly convex walls of the tires, said trough being curved only in a longitudinal direction, so as to have a straight cross sectional configuration at all locations along the length thereof, the chute further including a liner of a soft, resilient material curved longitudinally correspondingly to the trough, said liner being fixedly secured along its opposite side edges to the corresponding sides of the trough, the liner being formed with longitudinally extending corrugations each of which in width is substantially equal to the width of a tire adjacent thereto, the midwidth portion of each corrugation of the liner bearing against the surface of the trough so as to be engaged thereby against movement away from the periphery of the adjacent tire, the several wheels including filling tubes for supplying air under pressure to the tires, one tube for each wheel, said tubes being of L shape with each including a short leg connected in communication with the interior of the associated tire and an elongated leg extending longitudinally of the drum to one end of the drum, the several longer legs of the tubes being disposed in closely spaced relation to said end of the drum.

References Cited in the file of this patent

UNITED STATES PATENTS

| | | |
|---|---|---|
| 295,305 | Swingle | Mar. 18, 1884 |
| 2,265,380 | Maginn | Dec. 9, 1941 |
| 2,433,730 | Bridge | Dec. 30, 1947 |

OTHER REFERENCES

Clay: "Agricultural Engineering," April 1942, page 135.